United States Patent [19]

Lockhart et al.

[11] Patent Number: 5,412,522
[45] Date of Patent: May 2, 1995

[54] PORTABLE LOW PROFILE INFORMATION STORAGE SYSTEM

[76] Inventors: Wayne C. Lockhart, 561 Torwood La., Los Altos, Calif. 94022; Ted T.-M. Lin, 12307 Crayside La., Saratoga, Calif. 95070

[21] Appl. No.: 294,607

[22] Filed: Aug. 23, 1994

Related U.S. Application Data

[63] Continuation of Ser. No. 993,120, Dec. 18, 1992, abandoned.

[51] Int. Cl.6 .................... G11B 5/012; G11B 17/04
[52] U.S. Cl. .................. 360/97.01; 360/99.08
[58] Field of Search .................. 360/97.01–97.02, 360/98.04–98.08, 99.04–99.06, 99.08

[56] References Cited

U.S. PATENT DOCUMENTS

| | | |
|---|---|---|
| 4,933,785 | 6/1990 | Morehouse et al. . |
| 4,965,684 | 10/1990 | Stefansky . |
| 5,025,335 | 6/1991 | Stefansky . |
| 5,025,336 | 6/1991 | Morehouse et al. . |
| 5,027,241 | 6/1991 | Hatch et al. . |
| 5,043,974 | 8/1991 | Nakagawa . |
| 5,058,094 | 10/1991 | Suzuki . |
| 5,214,550 | 5/1993 | Chan .................. 360/97.01 |
| 5,235,481 | 8/1993 | Kamo et al. .................. 360/97.01 |
| 5,317,464 | 5/1994 | Witt et al. .................. 360/99.08 |

OTHER PUBLICATIONS

Kalok Product Brochure, Oct. 1991.
Ministor Product Brochures, MiniPort 32, 32P, 64, 64P, Jun. 1992.
Hewlett Packard Product Brochure, Kittyhawk Personal Storage Module, Aug. 1992.
SyQuest Product Brochure, The Iota Series, Feb. 1992.
Insite Peripherals Product Brochure, Floptical, 1992.

*Primary Examiner*—John H. Wolff
*Attorney, Agent, or Firm*—Flehr, Hohbach, Test, Albritton & Herbert

[57] ABSTRACT

Disclosed is a low profile information storage system including a low profile information storage cartridge having a housing consisting of a base and a cover defining a sealed chamber with one or more disks, transducers for the writing and reading of information, a portion of a drive motor stator, a drive motor rotor for rotating the disk(s), and a transducer actuator for positioning the transducers at selected locations over the disk(s) sealed in the chamber to maintain the disk(s) and transducers in a clean controlled environment, and a cartridge receiving assembly including the coil portion of the drive motor stator and mechanical means for accurately positioning and maintaining alignment of an inserted portable low profile information storage cartridge.

16 Claims, 11 Drawing Sheets

PORTABLE LOW PROFILE INFORMATION STORAGE SYSTEM

This is a continuation of application Ser. No. 07/993,120 filed Dec. 18, 1992, now abandoned.

FIELD OF THE INVENTION

This invention relates generally to information storage systems, and more particularly to such systems employing a cartridge receiving assembly and removable, interchangeable information storage cartridges incorporating magnetic heads, head actuator, hard disks and a disk drive.

BACKGROUND OF THE INVENTION

The increasing demand for computing, communications and information storage devices that are portable is evidenced by the development of smaller and smaller personal computers such as the portable, the lap-top, the notebook and the palm-top. Further, many specialized personal computing and communication devices such as personal digital assistants, foreign language translators, facsimile machines and mobile telephones have been introduced into the marketplace. All of these devices have the requirement for storage of significant amounts of information and, as a result, there has been continuing pressure to develop smaller, lighter, faster and more reliable information storage devices. In recent years technology has been pursuing two directions for the development of information storage devices to fulfill the needs of these products. The first direction has been the development of hard disk drives which utilize rotating magnetic disks and read/write transducers, a technology commonly referred to as "Winchester" technology. The second is the development of solid state semiconductor memory cards that utilize a technology known as "Flash" technology.

Smaller hard disk drives employing Winchester technology are being developed as evidenced by the drive described in U.S. Pat. No. 4,965,684 which is 1.0 inches in height; the drive described in U.S. Pat. No. 5,025,336 which is approximately 0.630 inches in height; the drive introduced to the market by KALOK, Inc. which is 0.5 inches in height; the drive introduced by MiniStor, Inc. which is 0.386 inches in height; and the drive introduced by Hewlett Packard which is 0.414 inches in height.

In addition to small size, the users of information storage devices want the device to be removable from the product to allow the transport of information between systems, to allow the device containing information to be protected or locked in a vault for security, and also, to provide a means for storing a duplicate copy of the information which is referred to as a "backup copy," that is—a copy that will be available if the original is lost or destroyed. Currently, the design of hard disk drives incorporates the control electronics on each drive. Although the drive can be removed from the product or system, it is clumsy to do so, damage to the control electronics and/or the drive itself represents a risk, and the cost of each unit is significant since each drive includes all of the control electronics, spindle drive motor and other major components thus making it expensive to be used as a "backup copy".

In attempting to continue reducing the height of Winchester hard disk drives, design engineers have been limited by the height of two major components in the drive. One is the spindle motor used to rotate the disks and the second is the voice coil actuator assembly which is used to position the read/write transducers at selected locations over the magnetic storage disk. Although progress has been made in reducing the height of these two required components, no design has been achieved which has resulted in a hard disk drive with a height less than those listed above.

Alternate design approaches (not using Winchester technology) have been employed in an effort to fulfill the needs of end users desiring to remove the information storage apparatus from the system. One design is that offered by the Iomega Corporation which utilizes a cartridge employing a flexible magnetic disk. The cartridge is removable from the drive mechanism and control electronics. This design approach has met with only limited success since the number of tracks per inch of magnetic disk space is limited due to the flexibility of the disk and the requirement to very accurately register the flexible disk relative to the read/write transducers when the flexible disk is inserted into the drive mechanism, thus the storage capacity of the device is limited and is not competitive with the storage densities achieved by Winchester hard disk drives. Further, the risk of losing information due to foreign material entering the cartridge is significant.

The SyQuest Corporation has introduced a design similar in concept to that of Iomega, except the removable disk cartridge incorporates a hard disk. This design is an improvement over the flexible disk concept, but still suffers from a capacity limitation due to the accurate registration required between the disk and the read/write transducers for high capacity. Contamination of the disk in the cartridge from foreign material with the resultant possibility of information loss is also a consideration and has limited the market acceptance.

Several other companies have attempted to greatly increase the storage capacity of flexible disks that are removable from the drive mechanism and control electronics. Perhaps the most creative design has been attempted by Insite Peripherals with the introduction of a flexible magnetic storage disk that writes and reads information with magnetic transducers, but employs a laser optical control servo system to control the position of the transducers over the recording track, thus attempting to greatly increase the number of tracks per inch of disk space. In spite of this novel approach, the storage capacity of the device has not proven to be competitive with classic hard disk Winchester technology. Further, the data transfer rate of 300 kilobits per second is considered relatively slow and the device has not been cost competitive. As a result it has not been well received in the marketplace and has not become a standard for either the transport or the backup of stored information.

Yet another approach to storing information is the use of the Compact Disk or CD ROM as it is called in the industry. This technology has been developed over a long period of many years by a large number of companies including such well known companies as SONY of Japan and Philips of The Netherlands. Compact disk technology employs a laser beam to write and read information on a rotating disk which has special coatings that are sensitive to the laser light. The CD ROM was first introduced as a read only device and received successful market acceptance for the distribution and playback of music and large data bases. Only recently have devices been introduced that will both write (record) and read (playback) information. The disks are rugged, reliable and can be easily removed from the device for transport. However, the system is sensitive to shock and vibration. Further, the time required to access the disk and write information is a very slow 300 milliseconds and is not considered competitive with Winchester technology which typically accesses the disk in 10 to 20 milliseconds.

In contrast to the rotating optical and magnetic disk approaches to information storage, the Flash Memory Card, which uses semiconductor technology, is robust, small in size (3.37 inches long by 2.13 inches wide and 0.129 inches in height), and is easily removable from the system. However, the information is stored on the memory card in a way that makes it difficult for the computer or other system to write and read the information. That difficulty has been resolved by the design of complex electronic circuits which make the memory card "look like" a hard disk drive to the computer. This additional electronics not only makes the memory card expensive, but also nullifies some of the space advantage that the memory card appeared to have as a result of its smaller size. In addition, the semiconductor integrated circuits used in the flash memory card are very expensive, costing many times the cost of a hard disk drive with an equivalent amount of information storage capacity.

SUMMARY OF THE INVENTION

This invention discloses a portable low profile information storage cartridge which can be inserted into and removed from a cartridge receiving assembly, herein sometimes referred to as a "slot assembly" that is particularly suited for mounting in small portable devices, but which can also be used in fixed devices or systems.

It is therefore an object of this invention to provide a portable low profile hard disk information storage cartridge which can be removed from the host device to: (1) insure security of the information stored; (2) allow transport and interchange of information between host devices and systems; and (3) allow duplicate copies of the information to be stored for safety in the event the original copy of the information is lost or damaged.

Another object of the invention is to provide a removable and easily stored portable low profile information storage cartridge whereby multiple such apparatuses may be selectively inserted into a mating slot assembly thus effectively providing the system or device into which the mating slot assembly has been installed with information storage capacity having no limit.

Another object of the invention is to provide an easily portable low profile hard disk information storage cartridge which is sealed and is sufficiently rugged to allow the cartridge to be transported within harsh environments while maintaining the integrity of the stored information.

Another object of the invention is to provide a portable low profile hard disk information storage cartridge with a length of 3.37 inches or less, a width of 2.13 inches or less and a height of 0.129 inches or less.

Another object of the invention is to provide a portable low profile hard disk information storage cartridge having a total weight of 3 ounces or less.

Yet another object is to provide a portable low profile information storage cartridge in which only a portion of the spindle drive motor stator used to rotate the hard disk information storage disk is contained inside the portable low profile information storage cartridge, thus allowing the height of the cartridge to be 0.129 inches or less.

Another object of the invention is to provide a portable low profile hard disk information storage cartridge in which only a portion of the voice coil actuator used to position read/write transducers at selected locations over the information storage disk is contained inside the portable low profile cartridge.

Another object of the invention is to provide a portable low profile hard disk information storage cartridge that can, when non-operational, withstand high gravitational forces without sustaining any loss of information.

Another object of the invention is to provide a cartridge receiving assembly with mechanical slots and keys designed to accept low profile hard disk information storage cartridges in one and only one orientation.

Another object of the invention is to provide a cartridge receiving assembly with a portion of a spindle drive motor stator suitable for magnetic coupling to a mating portion of the spindle drive motor stator incorporated in the portable low profile hard disk information storage cartridge.

Another object is to provide a cartridge receiving assembly with a portion of a voice coil actuator suitable for magnetic coupling to a mating portion of the voice coil actuator incorporated in the portable low profile hard disk information storage cartridge.

Another object of the invention is to provide a cartridge receiving assembly with mechanical means for accurately positioning and maintaining alignment of the portable low profile hard disk information storage cartridge described above relative to that portion of the spindle drive motor stator and that portion of the voice coil actuator incorporated in the slot assembly.

Another object of the invention is to provide a cartridge receiving assembly with mechanical means for moving either the portable low profile hard disk information storage cartridge or a portion of the cartridge receiving assembly to optimize magnetic coupling between that portion of the spindle drive motor incorporated in the portable low profile hard disk information storage cartridge and that portion of the spindle drive motor incorporated in the cartridge receiving assembly; and further, to assure magnetic coupling is optimized between that portion of the voice coil actuator incorporated in the portable low profile hard disk information storage cartridge and that portion of the voice coil actuator incorporated in the cartridge receiving assembly.

Another object of the invention is to provide an ejection mechanism to permit ejection of the portable low profile information storage cartridge from the slot assembly.

DESCRIPTION OF PREFERRED EMBODIMENT(S)

Figure 4:
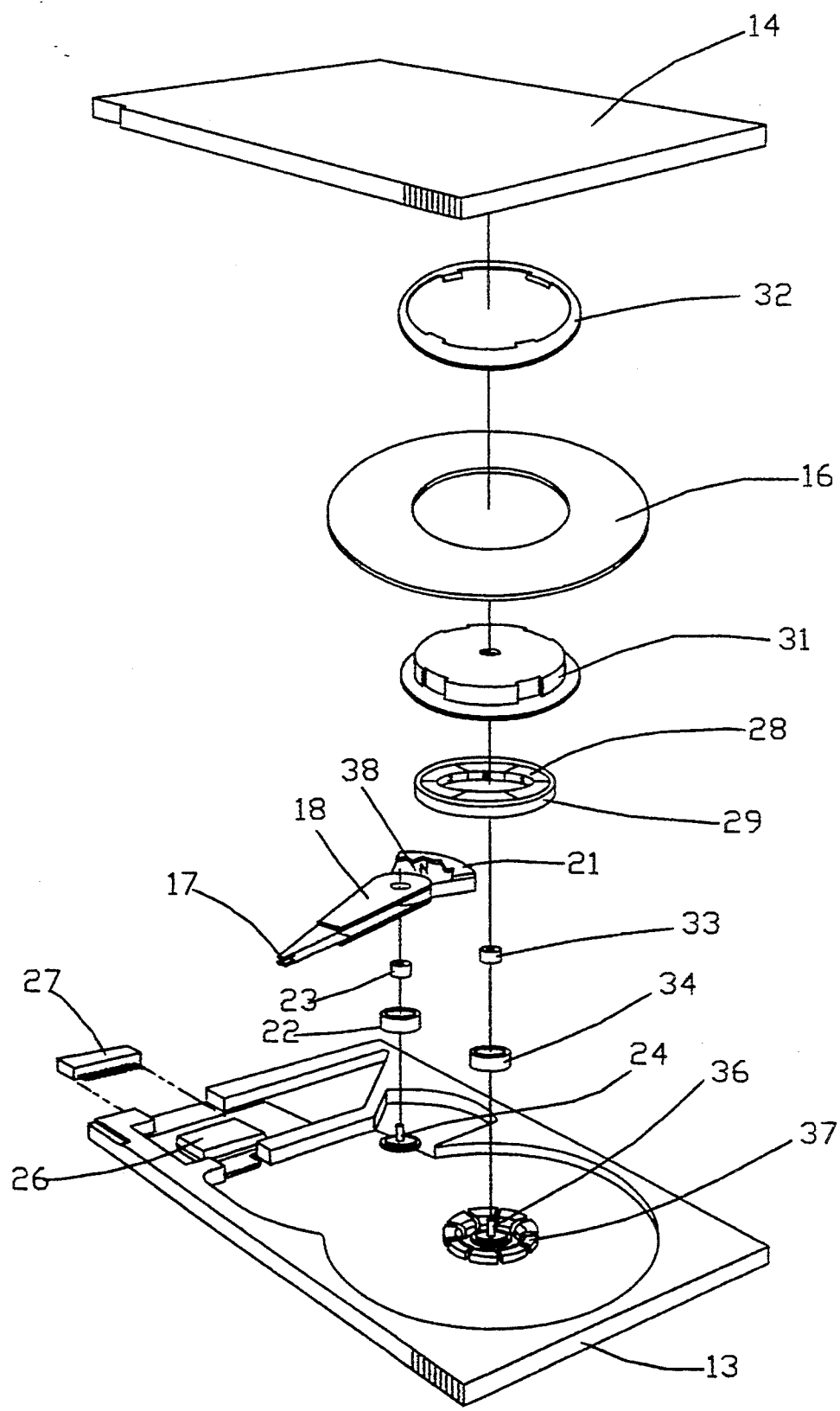
FIG. 4 is an exploded isometric view of the information storage cartridge shown in FIG. 2.
Figure 6:
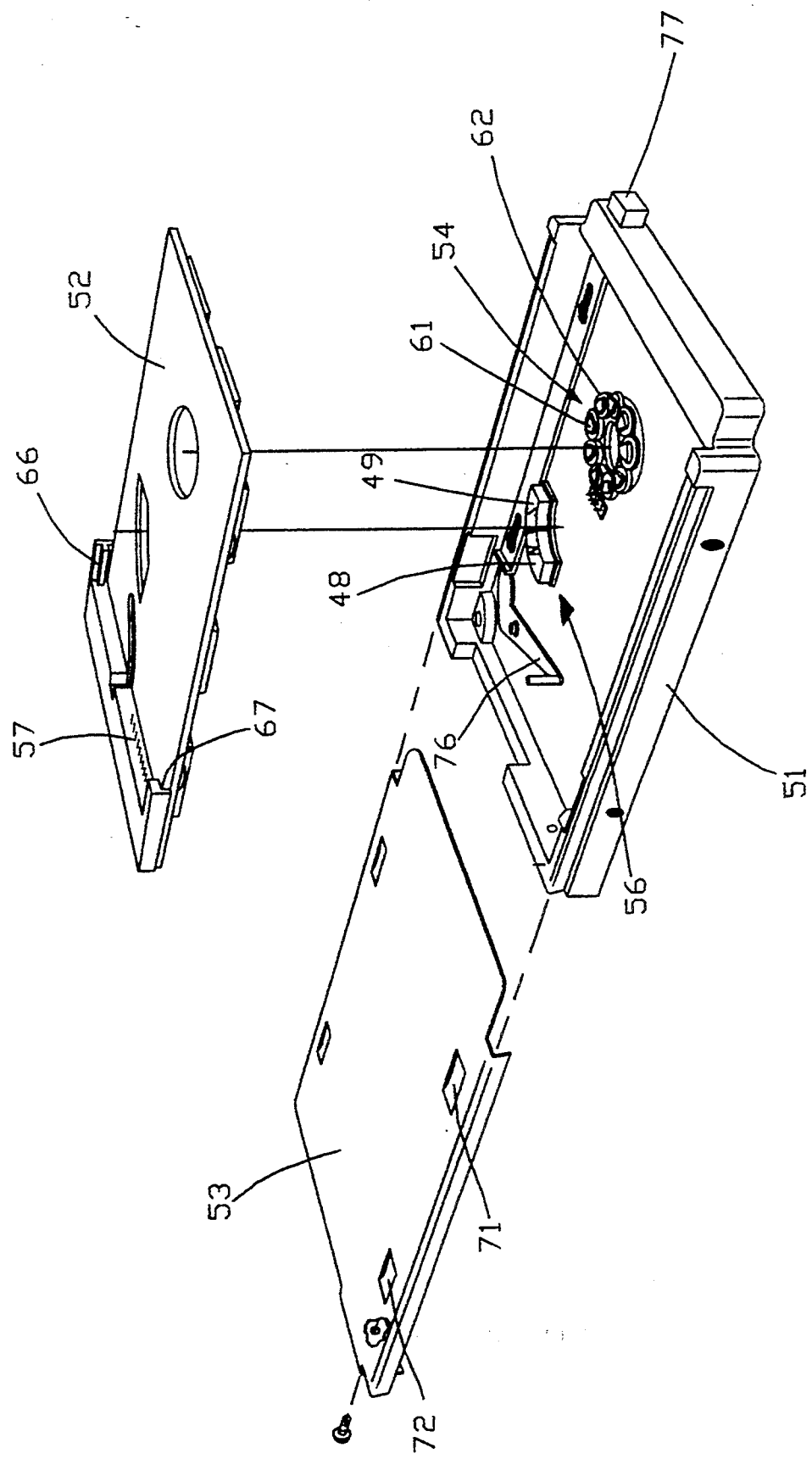
FIG. 6 is an exploded isometric view of another embodiment of a cartridge receiving assembly.
Figure 7:
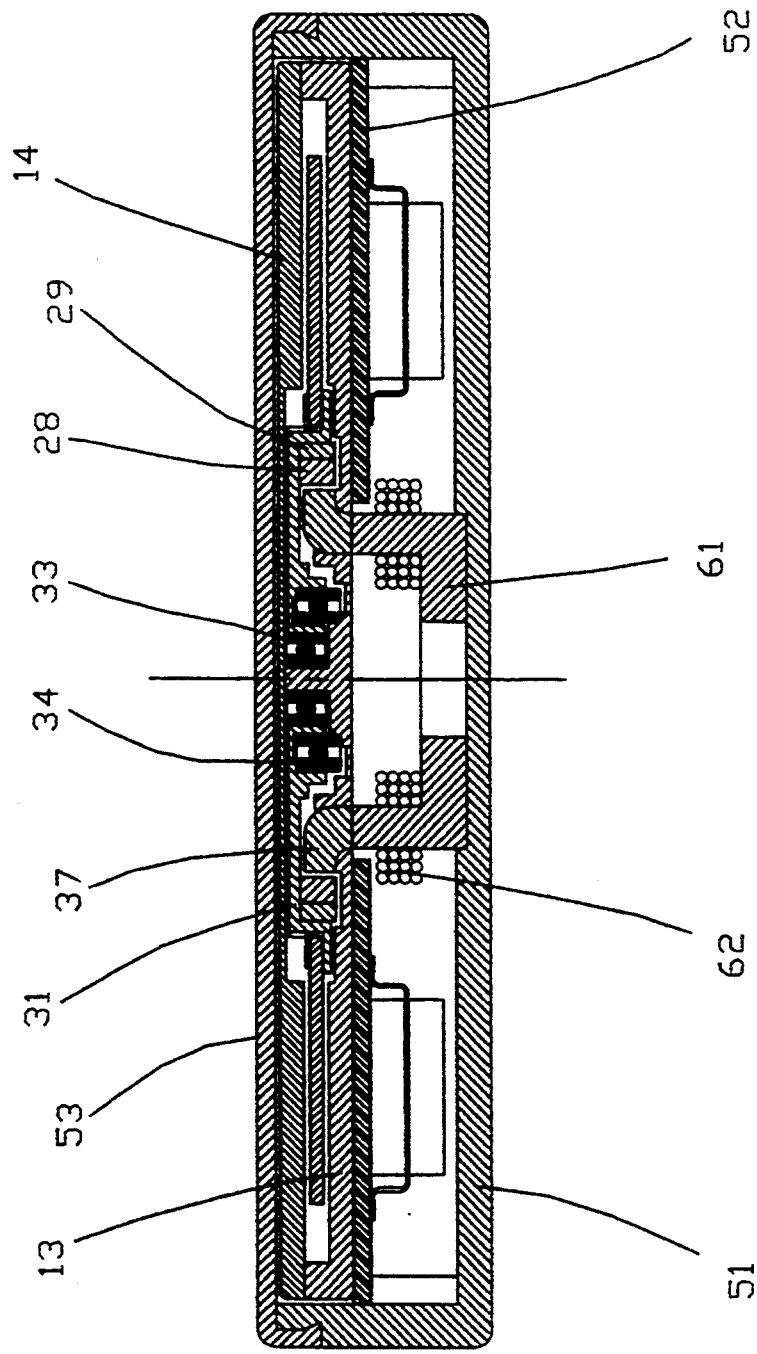
FIG. 7 is a sectional view of an information storage cartridge seated in a cartridge receiving assembly taken through the axis of the disc drive motor rotor and stator.

Referring to the figures, there is shown a disk drive system in accordance with the invention. The system includes an information storage cartridge 11, FIGS. 1–4, which is received by the cartridge receiving assembly 12, FIGS. 1, 5 and 6, to complete the portable, low profile information storage system. The cartridge includes a housing comprising a base 13 and a cover 14 which, when sealed together, provide a clean, controlled environment chamber for one or more storage disks 16 and one or more transducers 17 carried at the end of transducer arm 18 in cooperative relationship with the disk. The arm is pivoted at 19 and includes a portion 21 of a voice coil actuator which positions or actuates the arm to position the transducers or heads at selected locations on the disk 16. Referring to FIG. 4, the transducer arm 18 with transducer 17 is shown in an exploded view with concentric bearings 22 and 23 which support the arm from a shaft 24 extending upwardly from the base. A preamplifier 26 may be mounted in the base and is connected to the pin receptacles 27 and to the transducers 17. The disk 16 is rotatably supported on the base by a rotor assembly more clearly shown in the exploded view of FIG. 4 and the sectional view of FIG. 7. The rotor comprises permanent magnets 28 supported by a steel retaining ring 29. The magnets may be suitably secured to the ring 29 is by an adhesive, such as epoxy. A mounting hub 31 receives the rotor which is suitably retained, as by an adhesive. The hub receives and supports the disk 16 which is retained on the hub by a retaining ring 32. The hub engages concentric bearings 33 and 34 which are carried by the shaft 36 rising from the base 13. L-shaped stator pole pieces 37, FIGS. 4 and 7, are formed integral with the base with one leg extending parallel to the axis of the rotor supported by the base and extending to and flush with the bottom of the base 13. The other end of the L-shaped stator pieces 37 extends radially outwardly and cooperate with the permanent magnets 28. As will be described, an external rotating magnetic field is induced in the stator pole pieces 37 by the cartridge receiving assembly 12 and the field interacts with the field of the permanent magnets 28 to drive or rotate the disk. The housing base 13 and cover 14 are constructed of electrically conducting material such as aluminum, stainless steel or conducting plastic to ensure that any electrical charge to which the information storage cartridge is subjected will be distributed over the outside surface of the cartridge and will not penetrate inside the housing to erase data storm on the disk. Further, the housing is connected to a ground connection via the connector 27 to ensure that any residual electrical charge due to static electricity or other sources discharge by a common ground through the cartridge receiving assembly into the chassis of the device or system with which the slot assembly is associated.

As described above a portion 21 of the voice coil actuator is carried on one end of the transducer arm 18 to position the transducers 17 to read or write at selected locations on the disk 16. In the preferred embodiment of FIGS. 1, 2, 4 and 5 the portion 21 comprises a permanent magnet 38. When the cartridge 11 is seated in the cartridge receiving assembly 12, the magnetic field from the permanent magnet 38 interacts with magnetic flux generated by voice coils 39a, 39b carried in the cartridge receiving assembly shown in FIG. 5 and in the partial sectional view of FIG. 8.

Figure 8:
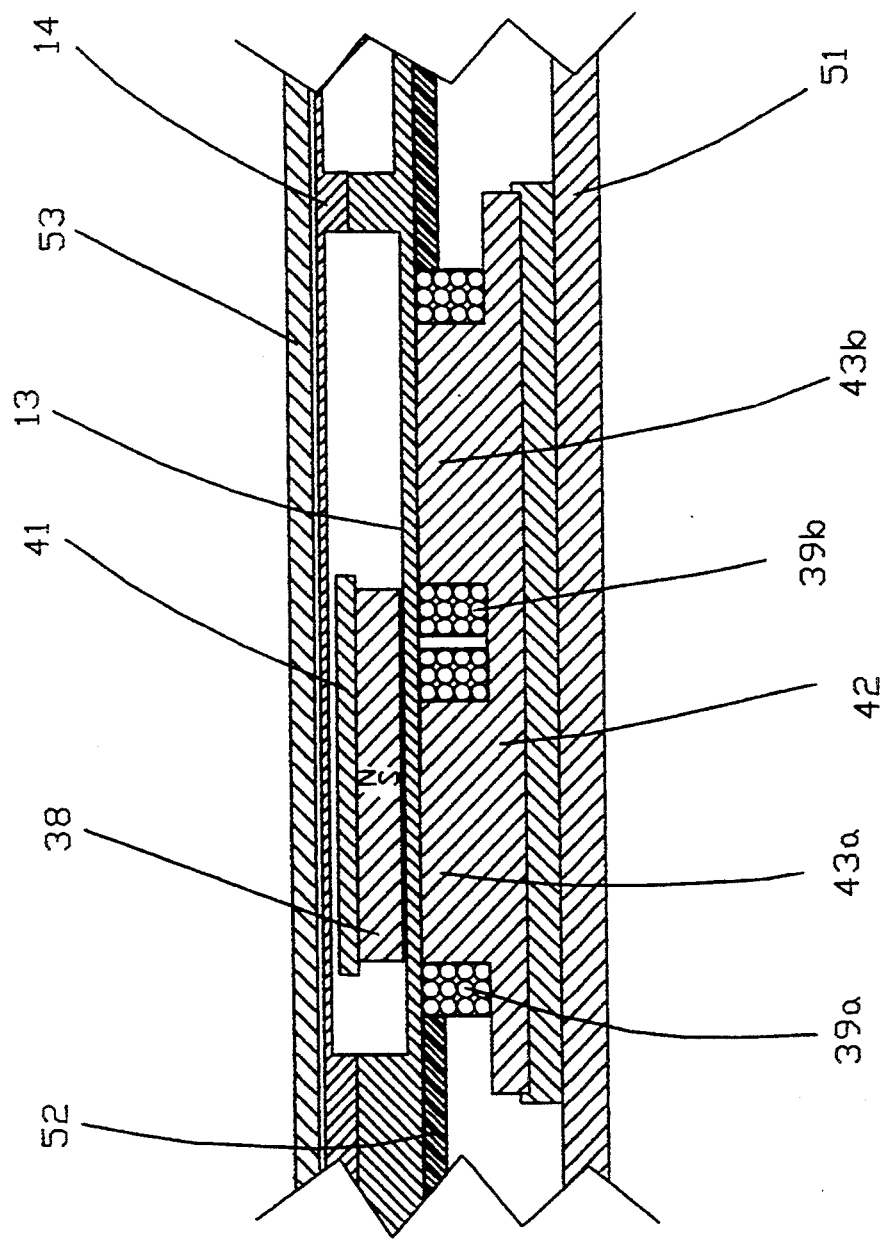
FIG. 8 is a partial sectional view of an information storage cartridge seated in a cartridge receiving assembly showing an embodiment of an actuator.
Figure 9:
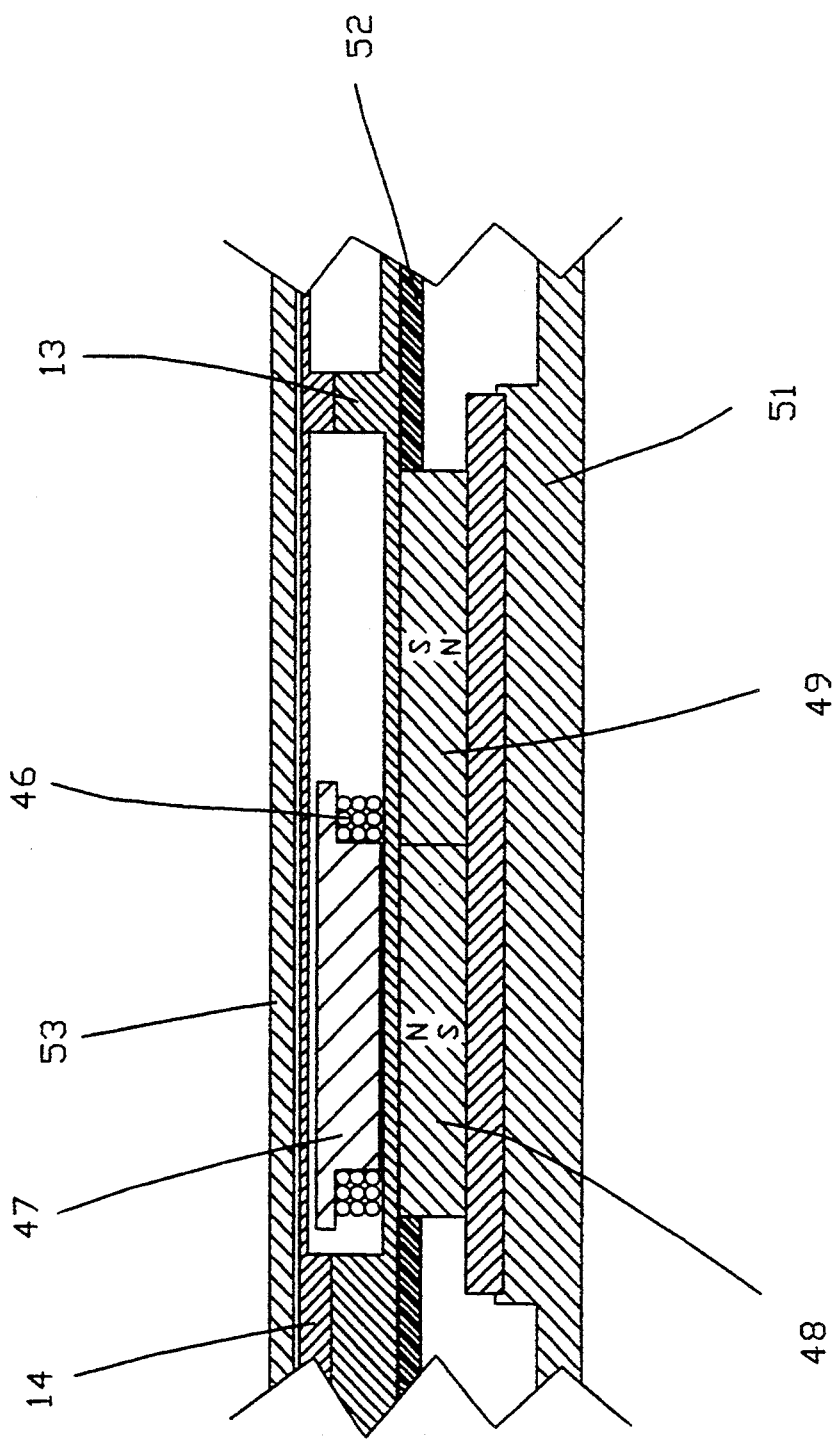
FIG. 9 is a partial sectional view of an information storage cartridge seated in a cartridge receiving assembly showing another embodiment of an actuator.

Referring specifically to FIG. 8, the permanent magnet 38 is carried by the plate 41 secured to arm arm 18 and which provides a low reluctance magnetic path. The magnet moves closely adjacent the base 13. The coils 39a, 39b are wound on the core 42. When magnetic core, 42. When the coils are energized, they provide opposite poles at the ends, 43a, 43b, depending on the exciting current. By controlling the current through the voice coils, the magnetic flux generated by the coil is controlled and interacts With the magnetic flux from the permanent magnet 38 on the arm 18 and causes movement of the magnet and positioning of the heads. In the embodiment in FIGS. 3, 6 and 9, a voice coil 46 is wound on the low reluctance magnetic core 47 and is carried by the transducer arm 18 and permanent magnets 48, 49 are carried in the cartridge receiving assembly 12 whereby when the cartridge is seated in assembly 12 there is magnetic coupling between the voice coil and the permanent magnets. The position of the heads is controlled by controlling the currents in the coil 46.

Figure 5:
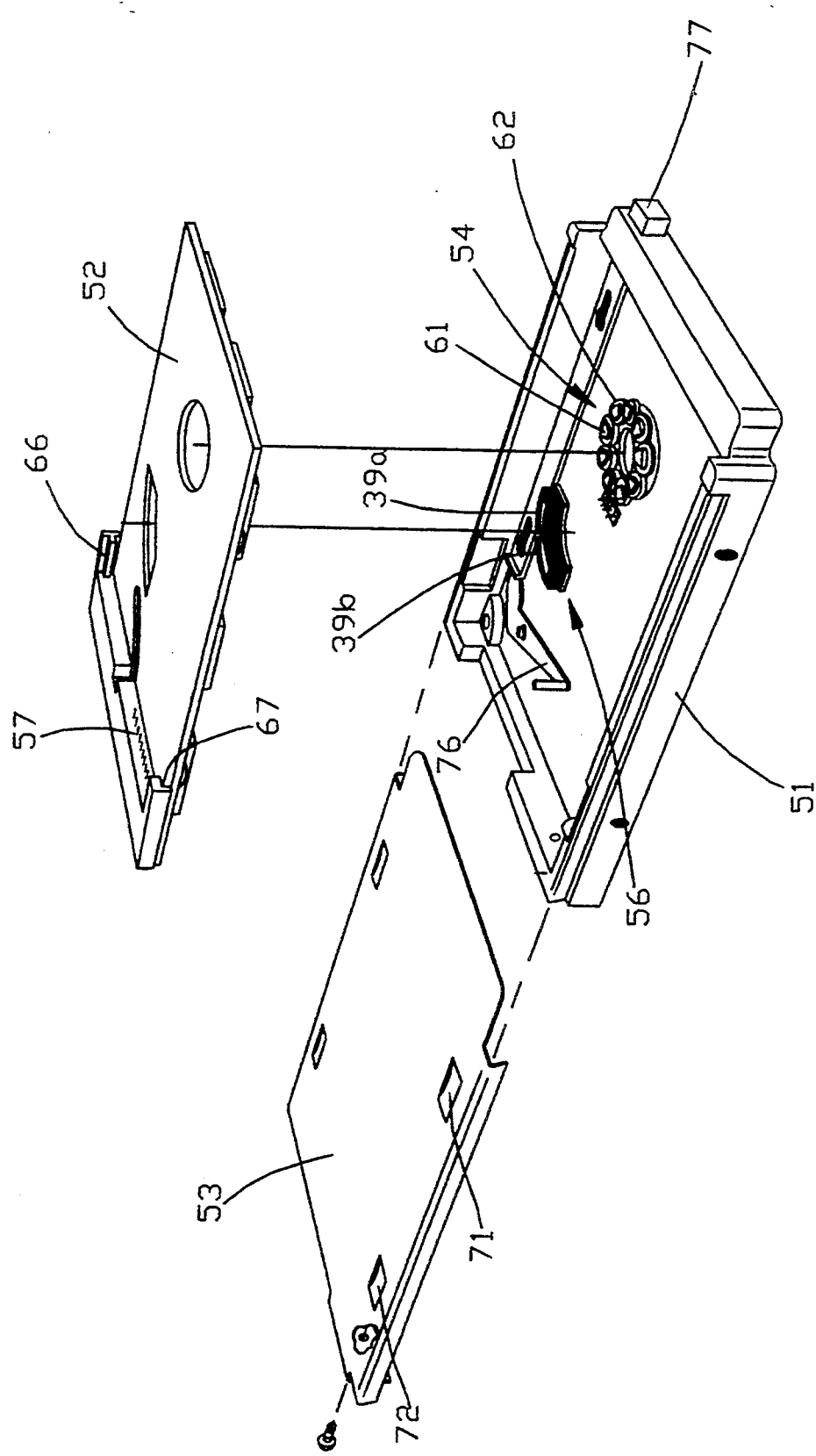
FIG. 5 is an exploded isometric view of a cartridge receiving assembly.

FIG. 5 is an exploded isometric view of the cartridge receiving or slot assembly 12. The slot assembly includes a base 51 which receives a shelf 52 and cover 53. The base 51, shelf 52 and cover 53 define a slot which receives and guides the cartridge 11. The base 51 supports a portion 54 of the spindle drive motor and a portion 56 of the voice coil actuator previously described. The embodiment illustrated in FIG. 5 shows the base supporting the voice coils 39a, 39b. The shelf includes the electrical connector pins 57 which connect to the connector 27 for transferring current and information to, and receiving information from, the information storage cartridge 11 when it is seated in the assembly 12. The assembly 12 also includes an electrical connector 58 for receiving current and transferring information between the information storage system and an associated computer or other information processing system.

The stator portion of the drive motor mounted on the base includes magnetic pole pieces 61, each of which has an electrical coil 62. When electrical current is supplied to these coils 62 from an external electrical power supply through the electrical connector 58, magnetic fluxes are generated by the coils 62 with the result that the magnetic pole pieces 61 are magnetized and a rotational magnetic field is established. As described above, pole pieces 37 in the cartridge are magnetically coupled to the magnetic pole 28 in the assembly 12 whereby they provide magnetic fields which interact with the magnet 28 for rotating the rotor and disks housed within the cartridge.

As described above, the cartridge is inserted into the slot defined between the cover 53, shelf 52 and base 51 and is guided into cooperative relationship with the magnetic fields of the actuator magnets and the stator pole pieces. In order to assure that the cartridges are properly oriented, the cartridge includes a key way 63 and a cutaway 64 which mate with the key 66 and cutaway 67 formed on the shelf 52. When the cartridge is seated, the axis of rotation of the drive motor is aligned with the axis of the stator, whereby they are magnetically coupled as described above. The cartridge receiving assembly includes a space between the base 51 and shelf 52 which accommodates the electronic components which control the operation of the disk storage system.

Figure 1:
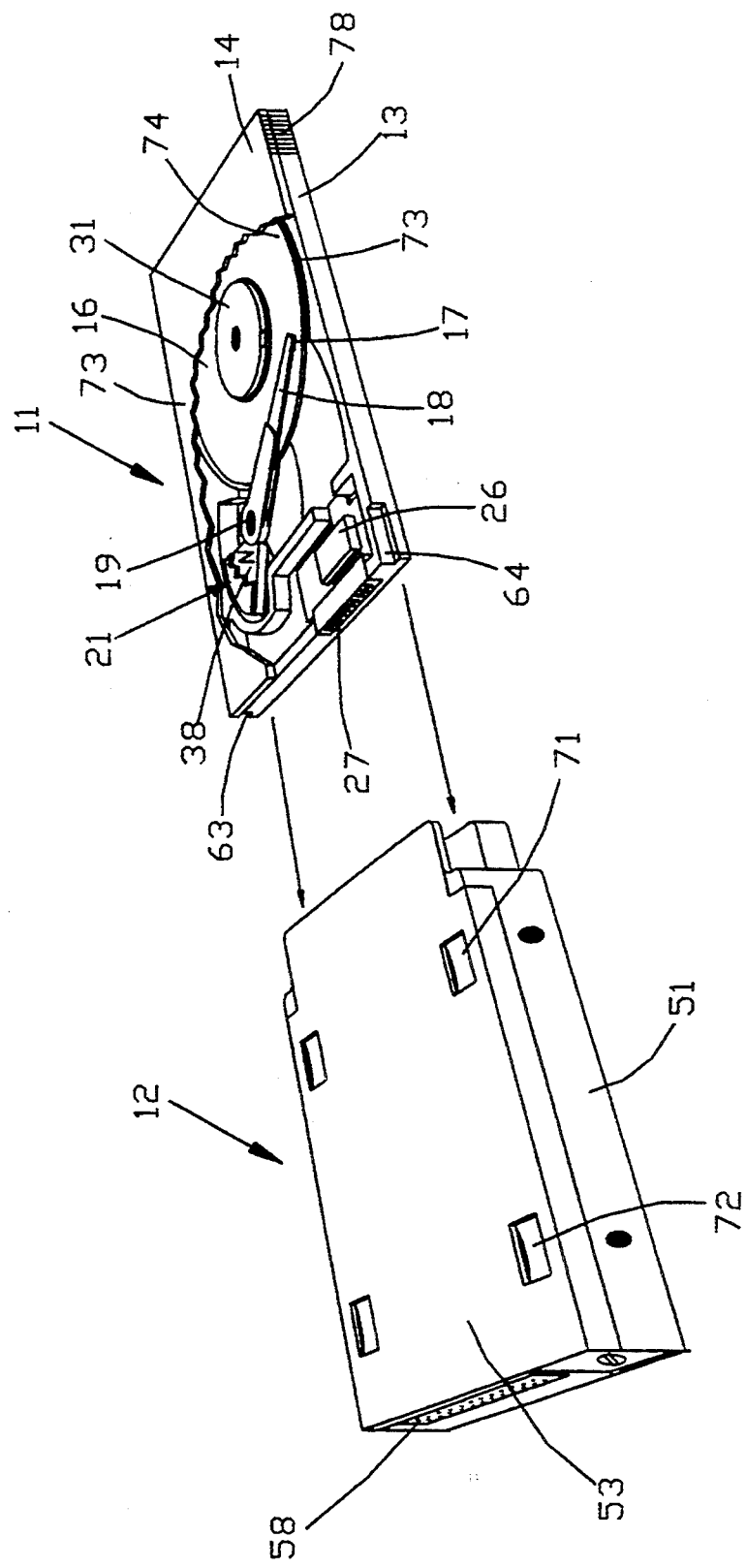
FIG. 1 is an isometric view of the portable low profile information storage system including an information storage cartridge and a cartridge receiving assembly.
Figure 2:
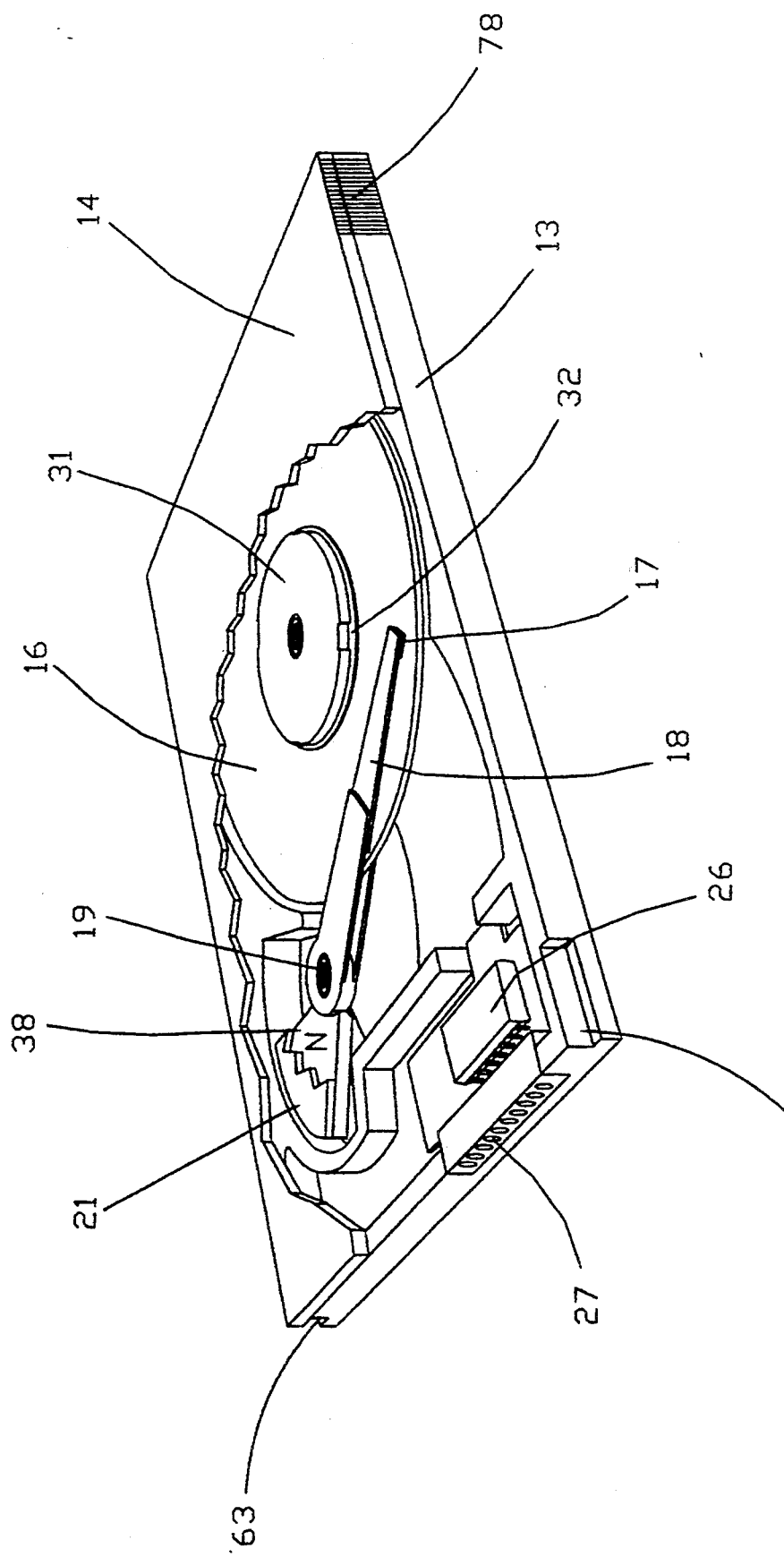
FIG. 2 is an enlarged isometric view of an information storage cartridge with the housing partially broken away to show the interior components.
Figure 3:
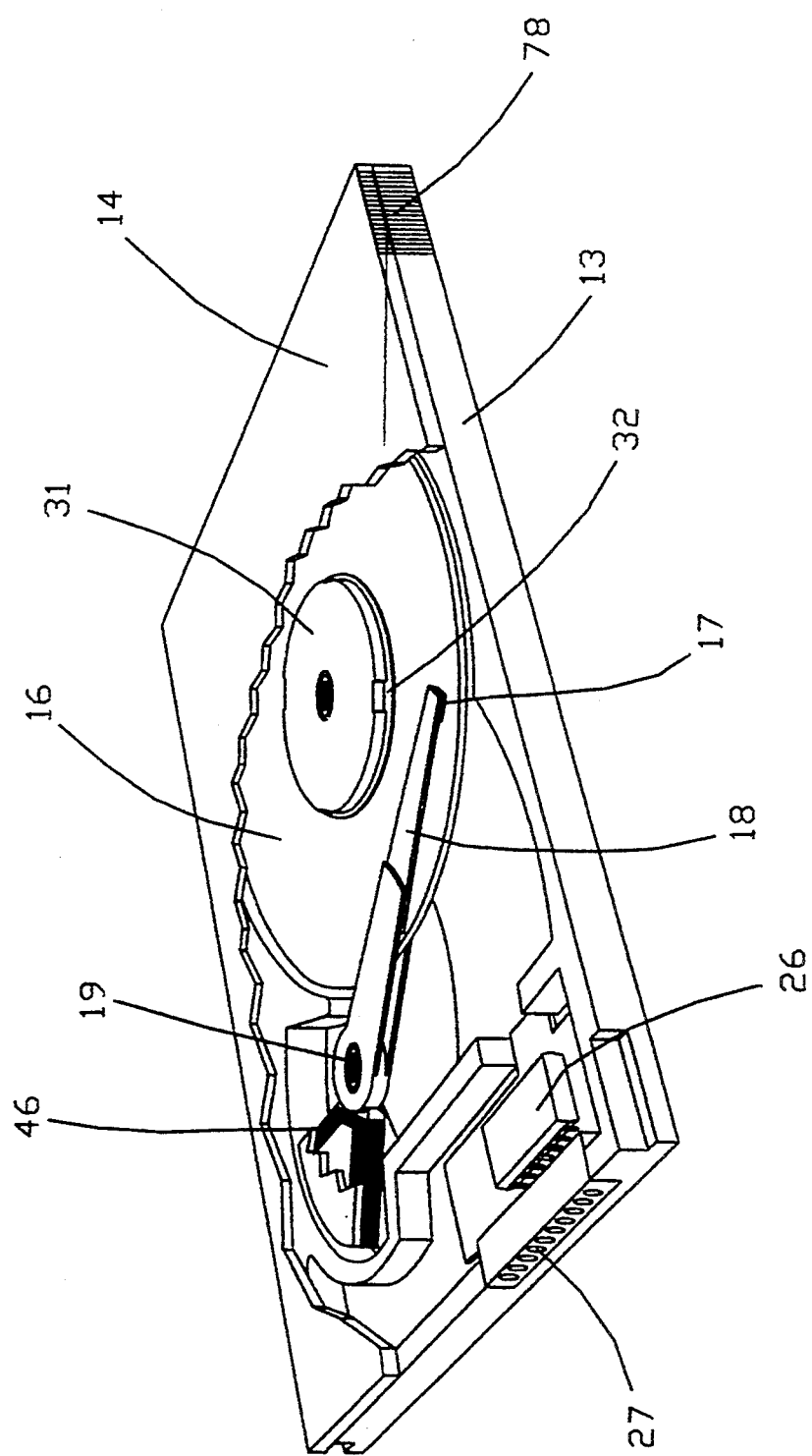
FIG. 3 is an enlarged isometric view of another embodiment of an information storage cartridge with the housing partially broken away.

When the cartridge is inserted in the slot, the springs 71, FIG. 1, initially engage the end of the cartridge to urge it downwardly. As the cartridge is inserted further, the springs 72 engage the end while the springs 71 act along the guideway 73. Finally, as the cartridge is fully seated, the springs 71 ride up the incline 74 to urge the cartridge downwardly to assure good magnetic coupling for the drive motor and actuator. When the cartridge is inserted it engages the lever 76, rotating it clockwise to move the ejector button 77 outwardly. When it is desired to remove the cartridge from the slot, the button 77 is depressed thereby urging the cartridge outwardly whereby the cartridge can be grasped at the knurled portions 78, FIGS. 1, 2 and 3.

Figure 10:
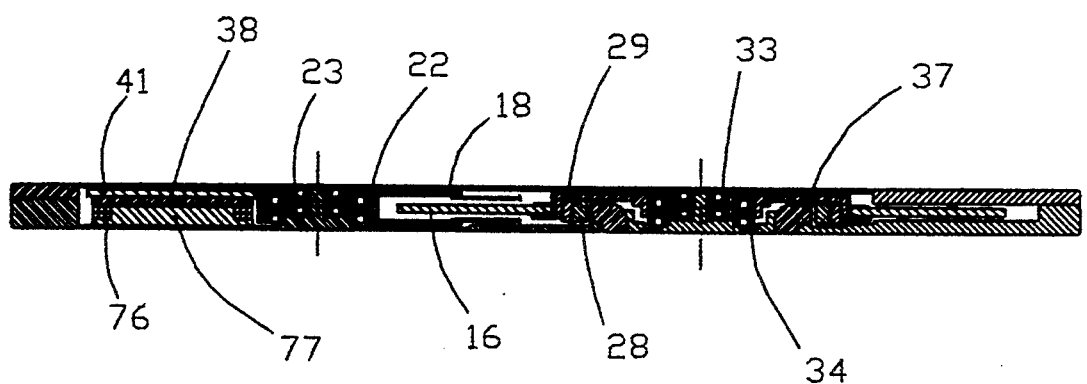
FIG. 10 is a sectional view of an information storage cartridge taken through the axis of the disk drive rotor and the axis of the head support arm bearings showing a complete head actuator within the cartridge housing chamber.
Figure 11:
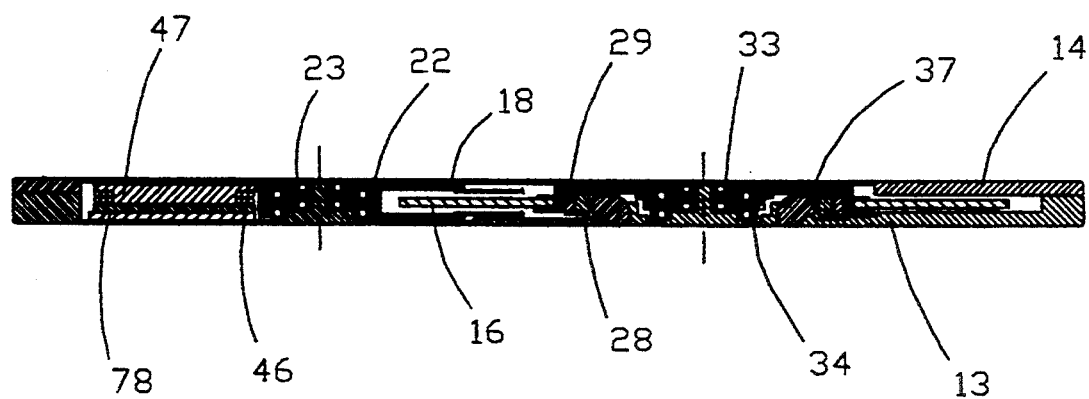
FIG. 11 is a sectional view of an information storage cartridge taken through the axis of the disk drive rotor and the axis of the head support arm bearings showing another embodiment of a complete head actuator within the cartridge housing chamber.

The actuator 21 for the transducer arm 18 has been described as including an in cartridge portion and a slot assembly portion. In another embodiment, the actuator may be completely contained in the cartridge housing. Two embodiments are shown in FIGS. 10 and 11. For the embodiment of FIG. 10, the permanent magnet 38 is mounted on the arm as in the embodiment of FIG. 2. However, the coil actuator is mounted within the cartridge. One coil 76 of two is shown on the low reluctance magnetic core 77. In the second embodiment, the coil 46 and core 47 are mounted in the arm as previously described. Permanent magnets 78 are mounted within the cartridge. The embodiments of FIGS. 10 and 11 may limit the thickness of the cartridge because both parts of the actuator are within the housing. However, it is believed that with etched circuit technology, the coils can be made extremely thin and mounted within the housing. The disk drive motor assembly is the primary component limiting the thinness of the cartridge. This invention, by removing the drive coils from the cartridge, permits the reduction of thickness of the cartridge.

Figure 12:
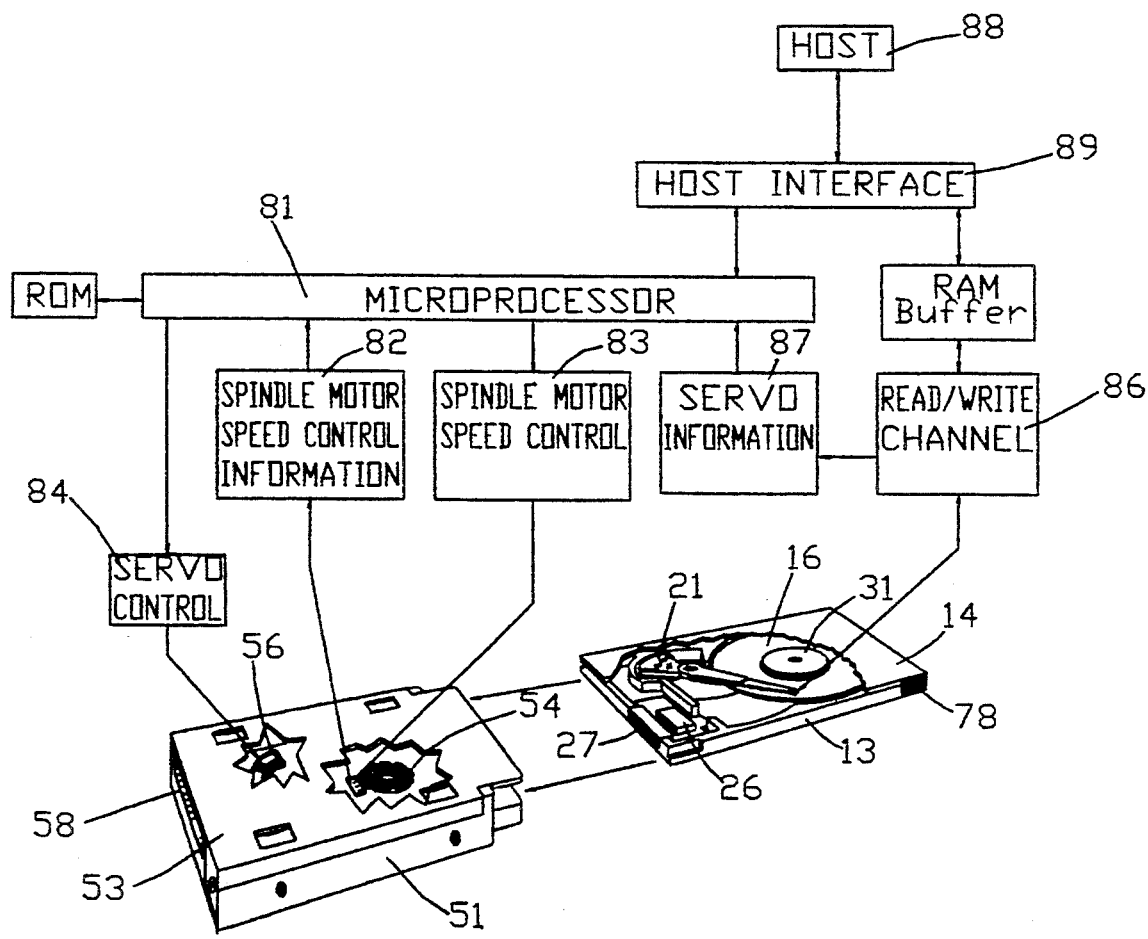
FIG. 12 is a simplified block diagram of a disk drive control system used in the disk drive.

With reference to FIG. 12, the drive control system includes a microprocessor 81 which directs the operation of the drive motor, particularly the excitation of the stator coils 62 to control the speed at which the disk is driven. For this purpose, 82 provides a signal which is representative of the rotor speed to the processor 81, and the processor controls the speed through the interface circuit 83. The processor controls the position of the heads via servo control interface 84 which controls the current to the actuator coils. Information regarding the location of the heads is supplied to the processor 81 from the read/write channel 86 through the servo information circuit 87. The host 88 in which the information storage system is installed communicates through the host interface 89 with the microprocessor when it controls the system to read/write information at selected locations on the storage disk 16.

The information storage cartridge includes a minimum number of the storage system components. As a result, it is relatively light in weight. If it is dropped, the forces are minimized, minimizing damage of the internal parts.

It is often customary to compare the storage capacity of a hard disk drive to the storage capacities achieved by previous designs. The current invention, however, discloses a method of utilizing a hard disk in a rugged portable low profile form factor cartridge that can be removed from the host device or system that is using the stored information. Further, a second, third, fourth or more duplicates of the cartridge can be interchangeably coupled into the slot assembly mounted in the host device or system. This effectively provides infinite information storage capacity to the user of the host device or system.

What is claimed is:

1. A low profile information storage system comprising:
   A. a cartridge including:
      (1) a housing having a base and cover;
      (2) an information storage disk mounted in said housing;
      (3) a rotor rotatably mounted on the base within said housing;
      (4) means for mounting said disk on said rotor;
      (5) means for mounting a plurality of permanent magnet pole pieces having radially extending poles on said rotor in a ring configuration;.
      (6) low reluctance L-shaped stator poles mounted on the base of said housing, said stator poles having a portion which extends axially with respect to said rotor and a portion which extends radially outwardly from the axis of the rotor with their ends in radial cooperative magnetic relationship with said radially extending magnet poles;
      (7) transducers in said housing for communicating information to and from said disk; and
      (8) means for positioning the transducers to cooperate with selected locations of said disk; and
   B. a cartridge receiving assembly including:
      (1) means for removably receiving and positioning said cartridge;
      (2) a stator in said assembly providing rotating magnetic fields which are magnetically coupled to the axially extending portion of said cartridge stator poles when the cartridge is positioned in said cartridge receiving assembly to couple the rotating magnetic fields to the rotor permanent magnetic poles and thereby rotate the rotor and mounted disk.

2. A system as in claim 1 wherein said means for positioning the transducers is mounted entirely within said cartridge.

3. A system as in claim 2 wherein said means for positioning the transducers comprises an arm pivotably mounted on said base.

4. A system as in claim 1 wherein said positioning means comprises an arm and an actuator comprising coil means magnetically coupled to permanent magnet means with either said permanent magnet means or coil means mounted on the arm to actuate the arm and the other of said permanent magnetic means or coil means mounted in said cartridge receiving assembly.

5. A system as in claim 4 wherein the permanent magnet means is mounted on said arm and said coil means is mounted in the cartridge receiving assembly.

6. A system as in claim 4 wherein the coil means is mounted on said arm and said permanent means is mounted in the cartridge receiving assembly.

7. A system as in claims 1, 2, 3, 4, 5 or 6 wherein said cartridge receiving assembly includes control electronics for controlling the transfer of information between said transducers and selected locations on said disk.

8. A system as in claim I wherein said means for removably receiving and positioning includes shaped guide means and said cartridge is correspondingly shaped whereby the cartridge can only be inserted in one orientation.

9. A system as in claim 8 in which said cartridge receiving assembly include ejector means for ejecting the cartridges.

10. A system as in claim 1 wherein said cartridge receiving assembly and said cartridge include means which cooperate to position said cartridge for efficient magnetic coupling.

11. An information storage cartridge including:
 a. a storage disk;
 b. a housing having a base for housing said disk;
 c. a rotor rotatably mounted on said base;
 d. means for mounting said disk on said rotor;
 e. means for mounting a plurality of permanent magnet pole pieces having radially extending poles on said rotor in a ring configurations.
 f. low reluctance L-shaped stator pole pieces mounted on said base with one leg extending radially outwardly with the ends in radial cooperative magnetic relationship with said radially extending rotor magnetic poles and the other leg extending parallel to the axis of the rotor arm adapted to receive an external rotating magnetic field;
 g. transducers for communicating information to and from said disk; and
 h. means for positioning the transducers in cooperative relationship with selected locations of said disk.

12. An information storage cartridge as in claim 11 in which said low reluctance stator poles have the end of said other leg flush with the exterior surface of said base.

13. An information storage cartridge as in claim 11 wherein said means for positioning said arm is mounted entirely in said housing.

14. An information storage cartridge as in claim 11 wherein said transducers are mounted on an arm pivotably mounted on said base, and means are mounted on said arm for rotating the arm to position the transducers.

15. An information storage cartridge as in claim 14 in which said means for rotating said arm comprises a permanent magnet mounted on said arm for cooperation with external magnetic fields.

16. An information storage cartridge as in claim 14 in which said means for rotating said arm comprises a coil mounted on said arm for cooperation with external magnetic fields.

* * * * *